Aug. 14, 1956     B. E. O'CONNOR ET AL     2,758,679
FLUTTER DAMPER WITH AIR BLEED

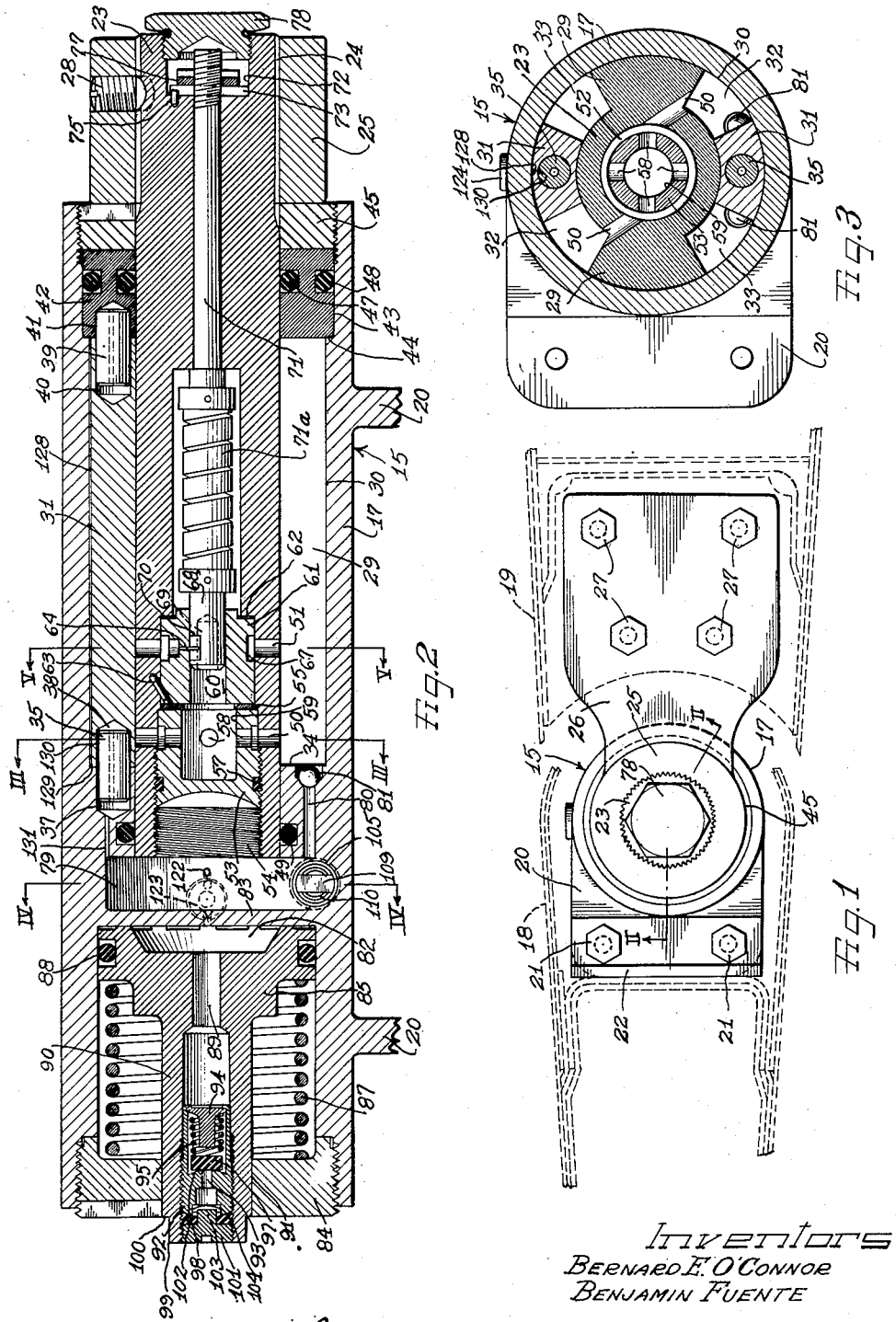

Filed Feb. 5, 1951     3 Sheets-Sheet 2

Inventors
Bernard E. O'Connor
Benjamin Fuente by Hill, Sherman, Meroni, Gross & Simpson Attys

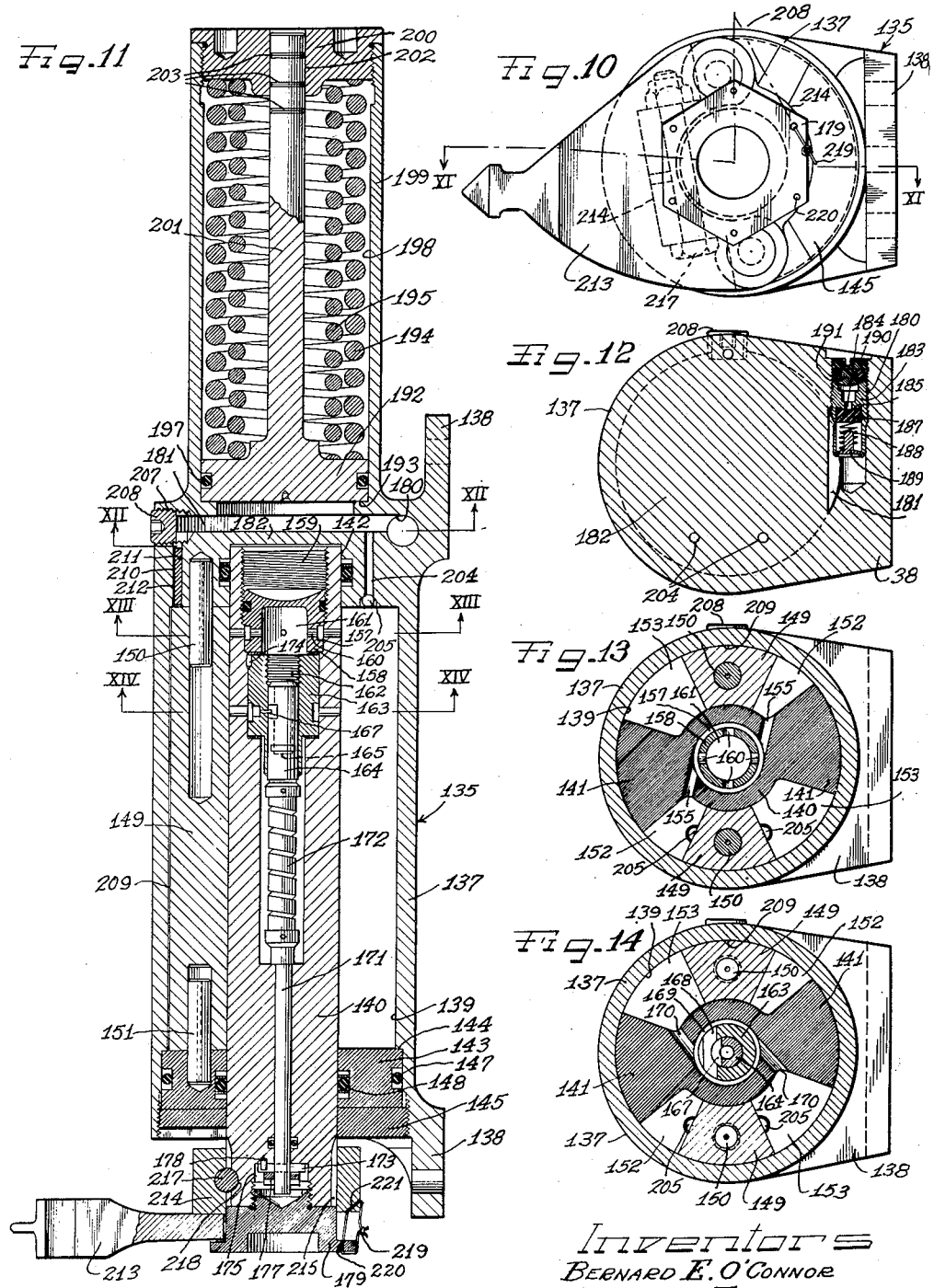

United States Patent Office 2,758,679
Patented Aug. 14, 1956

2,758,679

FLUTTER DAMPER WITH AIR BLEED

Bernard E. O'Connor, Buffalo, and Benjamin Fuente, Hamburg, N. Y., assignors to Houdaille Industries, Inc., a corporation of Michigan Application February 5, 1951, Serial No. 209,444

8 Claims. (Cl. 188—93)

The present invention relates to improvements in flutter dampers for aircraft, and more particularly for eliminating flutter of pivotally adjustable stabilizer and airfoil attachments such as elevators, ailerons, wing flaps, and the like.

An important object of the present invention is to provide an improved hydraulic flutter damper structure of rotary vane piston type which is adapted to operate satisfactorily although necessarily, in order to fit within the very small clearance provided therefor in service, of such small diameter that functioning of the damper under the loads that must be sustained in service would be seriously impaired in the absence of the improvements provided by this invention.

Another object of the invention is to provide a rotary hydraulic flutter damper construction that is especially adapted to function efficiently under the severe flutter-inducing loads, as well as great temperature variations encountered in service at the pivot joint of a pivotally adjustable aircraft elevator or wing construction.

A further object of the invention is to provide an improved flutter damper equipped to avoid leakage failure.

Still another object of the invention is to provide an improved flutter damper having novel deaeration means.

A still further object of the invention is to provide an improved flutter damper which is free from interference with proper functioning thereof in any position that the damper may assume during maneuvers of an aircraft with which associated.

It is an additional object of the invention to provide an improved flutter damper that is low in cost, simple to install and service and dependable and reliable in service.

Other objects, features and advantages of the present invention will be readily apparent from the following detailed description of certain preferred embodiments thereof taken in conjunction with the accompanying drawings, in which:

Figure 1 is an end elevational view of a vibration damper embodying features of the present invention and showing the same associated with mounting brackets, with air-foil structure shown in phantom outline;

Figure 2 is a more or less schematic longitudinal sectional view through the flutter damper taken roughly on the irregular section line II—II of Fig. 1;

Figure 3 is a transverse sectional detail view taken substantially on the section line III—III of Fig. 2;

Figure 10 is an end elevational view of a modified form of the flutter damper;

Figure 11 is a longitudinal sectional detail view through the damper of Fig. 10 more or less schematically laid out as though taken on substantially the irregular section line XI—XI of Fig. 10;

Figure 12 is a transverse sectional detail view taken substantially on the line XII—XII of Fig. 11;

Figure 13 is a transverse sectional detail view taken substantially on the section line XIII—XIII of Fig. 11; and Figure 14 is a transverse sectional detail view taken substantially on the line XIV—XIV of Fig. 11.

Figure 4:
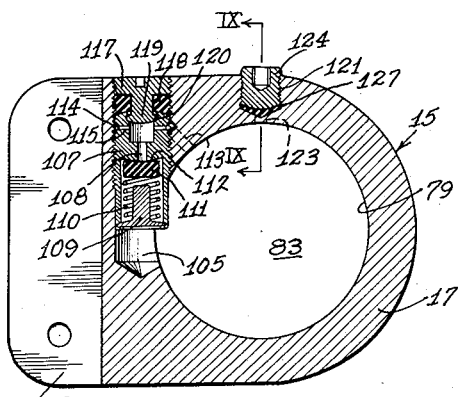
Figure 4 is a transverse sectional detail view taken substantially on the line IV—IV of Fig. 2.

A flutter damper 15 according to the present invention comprises, as a principal component, a substantially elongated, preferably cylindrical and relatively small diameter casing or housing member 17 (Figs. 1 and 2), of small enough external diameter to be received in free working relation within the butt or joint portion of a movable control surface member 18 of an airplane airfoil assembly such as an elevator or wing 19. As is well known, the control surface member 18, which in a stabilizer assembly comprises an elevator, and in a wing assembly comprises an aileron, flap, or the like, is mounted to swing pivotally about an axis, usually parallel to the edge of the airfoil body member 19, and for this purpose is provided with hinges (not shown) housed within the joint structure between the body and movable control members.

The construction and arrangement of the elongated housing member 17 of the flutter damper is such that it can be mounted coaxial with the hinge axis of the pivoted control member 18, and for this purpose is provided with suitable, preferably integrally carried attachment flanges 20 adjacent to the opposite end portions thereof and projecting co-extensively from one side of the housing for attachment as by means of bolts 21 to suitable brackets 22 carried interiorly by the movable control member 18 of the airplane. Through this arrangement, the housing 17 is secured rigidly to the movable control member 18 and therefore is rockable about its axis responsive to movements of the control member 18 as the latter swings, tends to swing, or is operated to swing about its hinge axis.

The flutter damper 15 is of the rotary vane hydraulic type operating on the principle of metered and valved control of displacement of hydraulic fluid between working chambers, permitting relatively free intentional movements of the controlled structure but resisting sudden or rapid movements of the controlled structure and for this purpose the damper is provided with a rotary wing shaft 23 which projects from one end of the housing 17. The projecting end portion of the wing shaft is serrated as indicated at 24 and has attached thereto removably an internally complementally dimensioned and serrated attachment eye 25 on a connecting arm 26 which projects laterally from the damper unit and is adapted to be attached as by means of bolts 27 to suitable structure within the adjacent joint portion of the airplane stabilizer or wing member 19. A set screw 28 retains the eye 25 against axial withdrawal from the engaged outer end portion of the wing shaft. Through this arrangement, the wing shaft 23 is held stationary relative to the airplane member 19 while the housing 17 is movable rotatably or oscillatably relative to the wing shaft 23 in accordance with swinging movements of the pivoted control member 18.

Spaced inwardly from its outer end extremity, the wing shaft 23 has thereon a pair of diametrically opposite laterally projecting and longitudinally extending vanes or wings 29 (Figs. 3 and 5) which at their outer edges are conformed to the internal diameter of a cylindrical surface 30 within the casing 17. The wings 29 cooperate with a pair of diametrically opposite dividers or abutments 31 of preferably substantially the same length as the wings 29 and secured within the cylindrical chamber 30 at diametrically opposite sides thereof intermediate the vanes 29 to divide the cylindrical chamber 30 into four working chambers comprising a pair of opposite working chambers 32 and a second pair of opposite working chambers 33.

At their inner ends, the abutments 31 are secured fixedly in place within the casing 17 by engagement with a shoulder 34 provided by an intermediate reduced diameter portion within the casing and upon which the inner ends of the rotary piston wings 29 are slidably engaged. Respective dowels 35 engaging within dowel bores 37 in the shoulder 34 and in dowel bores 38 in the adjacent end portions of the abutments 31 provide anchorage against lateral displacement of the inner end portions of the abutments.

At their outer end portions, the abutments 31 are retained against lateral displacement by means of pins or dowels 39 secured within respective dowel bores 40 in the outer end portions of the abutments and secured within the dowel bores 41 provided in the inner face of a closure head plate 42 received within a counterbore 43 at the outer end portion of the cylindrical chamber 30 and resting against a limit shoulder 44. A ring nut 45 fixedly clamps the head closure plate 42 against the shoulder 44. The assembled relationship of the head closure plate 42 as maintained by the shoulder 44, relative to the inner shoulder 34 is such as to drive the abutments 31 securely against the shoulder 34 but to allow a slidable bearing relationship with respect to the opposite ends of the rotary piston wings 29.

Bearing for the opposite end portions of the rotary piston wing shaft 23 is afforded adjacent the outer end portion thereof by the closure member 42, with fluid seal about the wing shaft being provided by a sealing O-ring 47 recessed in the bearing surface of the closure disk ring 42, and a sealing O-ring 48 at the interface between the outer periphery of the closure ring 42 and the casing 17, herein being recessed into the periphery of the closure ring. The inner end portion of the piston wing shaft 23 is journaled in the inner reduced diameter shoulder portion of the casing, with a fluid anti-leak seal being provided by an O-type sealing ring 49 in this instance recessed into the supporting bearing surface surrounding the inner end portion of the shaft.

Figure 5:
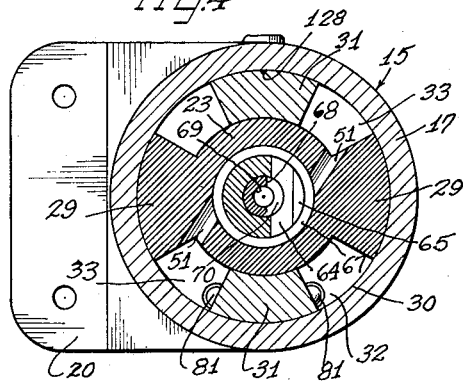
Figure 5 is a transverse sectional detail view taken substantially on the line V—V of Fig. 2.

For operation, the housing chamber 30 is filled with hydraulic fluid, and means are provided for controlling the displacement of the fluid between the working chambers 32 and 33 in the relative rotation of the casing 17 and the wing shaft 23. To this end, displacement ports 50 lead from the working chambers 32 toward the interior of the wing shaft 23 (Fig. 3) while displacement ports 51 lead from the working chambers 33 toward the interior of the wing shaft 23 (Fig. 5). The displacement ports 50 communicate with an annular fluid distribution channel 52 provided in the periphery of a circular plug block 53 which is threadedly secured within an internally threaded axial bore 54 opening into the inner end portion of the wing shaft 23. The plug 53 is secured against a limit shoulder 55 provided by a slightly reduced diameter portion in the bore 54. A thread seal 57 is provided on the periphery of the plug 53 to prevent leakage thereby.

From the distribution channel 52 a plurality of radially extending passages or ports 58 open into an axial blind end chamber bore 59 within the plug 53 and opening toward the outer end of the wing shaft 23.

The chamber 59 communicates with an axial chamber bore 60 within a valve block 61 secured within the axial bore 54 of the wing shaft between the adjacent end of the plug 53 and a reduced diameter intermediate shoulder 62 formed on the wing shaft. While the plug 53 holds the block 61 in its axial position, a pin 63 (Fig. 2) secured to a corner portion of the block and into the wall of the wing shaft retains the block against rotary displacement and thus holds the block substantially rigid with the wing shaft.

Communication between the central bore 60 of the block 61 and the fluid displacement ports 51 is effected (Figs. 2 and 5) through a narrow chordal metering slit 64 which intersects a chordal sector of the wall of the bore 60 and opens into a substantially wider peripheral chordal slot 65 in the outer periphery of the block 61 opening into an annular fluid distribution groove 67 in the perimeter of the block and communicating with the displacement ports 51. There is thus provided intercommunication between the displacement ports 50 and 51.

Adjustable valve means are provided for controlling fluid displacement through the metering slit 64. Herein such valve means comprises a cylindrical valve member 68 which is rotatably slidable in bearing relation within the axial passage bore 60 in the block 61 and has a blind end chamber bore 69 opening from the inner end thereof and intersected in a chordal sector at one side thereof by a relatively wide peripheral slot 70 registering with the metering slit 64. As shown in Figs. 2 and 5, the metering slit 64 and the valve slot 70 are in the full open flow relationship. By turning the valve member 68, the area of the metering slit 64 communicating with the passage chamber or bore 69 can be restricted by increments to increase the resistance to displacement of hydraulic fluid between the working chambers, as desired. There is thus provided a variable displacement control orifice.

Figure 6:
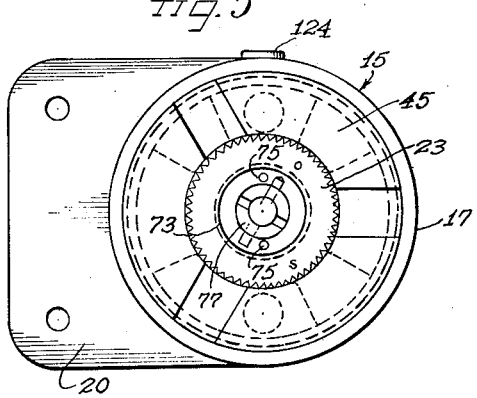
Figure 6 is an end elevational view of the flutter damper looking toward the same end as in Fig. 1, but on an enlarged scale and with the shaft end closure cap removed.

Means for effecting adjustments of the orifice valve 68 comprise a stem 71 projecting slidably axially through a complementary reduced diameter portion of the axial bore in the wing shaft 23 and with the outer end portion of the stem 71 exposed within an outwardly opening counterbored recess 72 in the outer extremity of the wing shaft. For turning the stem 71 manually, it is provided with means such as a transverse handle pin 73 providing a pointer which is adapted to be indexed as shown in Fig. 6, between diametrically opposite limit pins 75 which are mounted to project from the bottom of the recess 72 to limit the extreme range of turning movement of the orifice valve by limiting the swinging movement of the pointer 73. Any adjusted condition of the valve is maintained by means of a lock nut 77 which is threaded onto the outer extremity portion of the stem 71 and in the locked condition drives the pointer 73 clampingly against the bottom of the recess 72. After the desired adjustment has been effected and the lock nut 77 screwed down tight, a protective closure cap 78 is threaded into the recess 72.

In order to compensate for the great variables in temperature encountered in the service of the flutter damper in an airplane, automatic thermostatic adjustment means are provided to effect compensations in the adjustment of the orifice valve 68. For this purpose a spiral thermostatic element 71a is connected between the valve member 68 and the stem 71 so that while the stem 71 is secured in fixed primary adjusted condition, the thermostatic element 71a will operate to close the orifice from a mean temperature rated adjustment when the temperature increases and thereby the viscosity of the fluid is lowered, and to open the fluid displacement orifice when the temperature decreases below the mean rated adjustment and the viscosity of the fluid increases, thereby compensating for temperature variations.

It is extremely important for the efficient functioning of the flutter damper that the working chambers 32 and 33 remain at all times thoroughly filled with hydraulic fluid. Accordingly, means are provided for maintaining the working chambers continuously supplied with hydraulic fluid under a replenishing pressure head. To this end, the housing casing 17 is provided at the inner end of the wing shaft 23 with a pressurized replenishing chamber 79 communicating with the working chamber through a plurality of replenishing passages or ducts 80 extending axially through the reduced diameter shaft bearing portion within the casing and controlled against escape of hydraulic fluid from the working chambers by check valves such as ball valves 81 (Figs. 2, 3 and 5).

Hydraulic fluid under pressure is supplied to the replenishing chamber 79 from an auxiliary replenishing chamber 82 which is separated from the chamber 79 by an imperforate partition 83 and is preferably formed in the adjacent end extremity portion of the housing casing 17, normally opening from the extremity of the casing. A closure plug or cap 84 is threaded into closing relation to the outer end extremity or mouth of the chamber. Within the auxiliary replenishing chamber 82 are means for filling the replenishing chambers and for maintaining the hydraulic fluid within the chambers under pressure. Such means comprise a piston 85 which is normally urged toward the partition 83 by biasing means such as a coiled compression spring 87 bearing at one end against the piston and at the opposite end against the closure member 84. A peripheral fluid seal about the piston 85 and engaging the cylindrical wall defining the chamber 82 is provided by means such as a resilient O-ring 88.

Hydraulic fluid is adapted to be fed into the damper through the piston 85. For this purpose the piston 85 is provided with an axial bore 89 extending entirely therethrough from end to end and through a piston rod or stem 90 projecting outwardly from the piston and in slidable bearing relation through a bearing aperture 91 in the end closure member 84. Mounted within the outer end portion of the bore 89 within the stem 90 is a check valve structure comprising a plug 92 which is threaded into an enlarged diameter outer portion of the bore 89 and has an axial fluid passage 93 therethrough which is intermediately of relatively small diameter and of substantially larger diameter at the opposite end portions of the plug 92. At the inner extremity of the inner enlarged portion of the passage bore 93 is mounted a spider member 94 providing a seat for a coiled compression spring 95, the opposite end of which drives a resilient block check valve member 97 into sealing relation against a convex seat 98 disposed about the reduced diameter portion of the passage 93. Thereby hydraulic fluid can be delivered from the outer end of the passage 93 through the check valve into the piston passage 89 and thence into the auxiliary replenishing chamber 82, return of the fluid being checked by the resilient, preferably rubber or rubber-like check valve block 97. As hydraulic fluid is forced under pressure into the chamber 82, the piston 85 moves outwardly in opposition to the bias of the spring 87 which thereby maintains the fluid in the chamber 82 under pressure.

Figure 7:
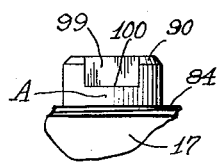
Figure 7 is a fragmentary side elevational view of the opposite end extremity of the damper.

Visual indication of the extent to which the chamber 82 is filled is afforded by the outer extremity portion of the piston stem 90 serving as a filling index. To this end, the stem 90 may project a predetermined distance from the outer face of the closure member 84 in the fully retracted position of the stem and with means on the projecting extremity portion of the stem which will cooperate with the outer face of the member 84 to indicate that the chamber 82 is unfilled. Herein such indicating means comprise one or more flat side areas 99 on the projecting extremity portion of the stem, each having an inner shoulder 100 at juncture with the normal periphery of the stem 90. The shoulder 100 registers substantially with the outer face of the closure member 84 in the empty condition of the chamber 82 and thus the fully retracted position of the stem 90, but moves into spaced relation to the outer face of the member 84 in proportion to the volume of fluid filling the chamber 82 inwardly of the piston 85 and thus holding the piston 85 spaced from the partition 83 in opposition to the biasing spring 87. In Fig. 2 the unfilled condition of the chamber 82 is indicated whereas in Fig. 7 a loaded condition of the chamber 82 is indicated by projection or extension of the piston stem 90 to a distance which carries the index shoulder 100 a substantial spaced distance from the face of the member 84 whereby to expose an index area A of the periphery of the stem 90 intervening between the shoulder 100 and the surface of the member 84. If desired, the index area A may be calibrated with markings to indicate at a glance how much fluid is in the chamber 82.

After the desired amount of fluid has been filled into the damper through the check valve plug 92, a stopper plug 101 is threaded into the outer extremity of the threaded portion of the piston stem bore and sealingly presses a resilient sealing ring 102 against the outer end of the plug 92. To implement the sealing action of the resilient ring 102, the plug 101 has a stem 103 fitting closely through the ring 102 and extending into a clearance recess 104 in the outer end portion of the plug 92, and the end of the plug is tapered laterally so that when the closure plug 101 drives the sealing ring 102 against the end of the valve plug 92, the sealing ring will be caused to displace into snug sealing engagement with not only the threaded wall of the piston stem bore intervening between the valve plug and the closure plug but also against the closure plug stem 103.

Figure 8:
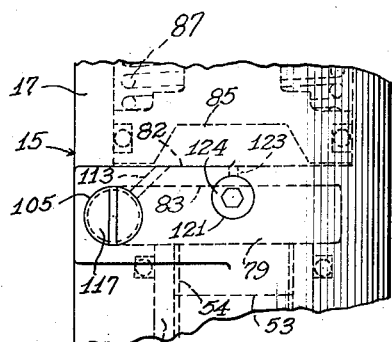
Figure 8 is a fragmentary top plan view of that portion of the damper through which the section of Fig. 4 has been taken.

Check valved passage means are provided for pressure displacement of hydraulic fluid from the auxiliary replenishing chamber 82 into the replenishing chamber 79. By preference, such means are of a character to provide a second filling or supply opening as well. To this end, the housing casing 17 is provided with a bore 105 (Figs. 2, 4 and 8) extending in from the top of the casing and opening on substantially a tangent of the periphery of the replenishment chamber 79. Threaded into the outer end portion of the bore 105 is a check valve plug 107 which in most respects is similar to the check valve plug 92. The inner extremity of the plug 107 extends into the adjacent peripheral portion of the replenishment chamber 79, and with the blind end inner extremity of the bore 105 spaced from the inner end of the plug and providing additional fluid space for the replenishment chamber. Axially through the body of the check valve plug 107 is a passage 108 which intermediately of its length is of substantially reduced diameter and with the inner larger diameter portion thereof housing a spider member 109 which is secured at the inner extremity of the plug body and supports the inner end of a coiled compression spring 110, the opposite end of which bears against and drives a check valve resilient block 111 against a convex valve seat 112 surrounding the inner end of the smaller diameter portion of the fluid passage 108. Thereby fluid can pass through the passage 108 into the chamber 79 but is checked against escaping from the replenishment chamber 79 through the passage 108.

For the displacement of hydraulic fluid under pressure from the auxiliary replenishing chamber 82 into the replenishment chamber 79, a passage 113 leads from the chamber 82 through the proximate face of the partition 83 and the adjacent portion of the housing into the bore 105 adjacent the head end of the check valve plug body 107. An annular peripheral groove 114 in the plug body head communicates with the passage 113 and has a plurality of radial ports or orifices 115 leading into the outer enlarged portion of the passage 108 for displacement of fluid from the auxiliary replenishing chamber 82 under pressure through the passage 113 and thence through the groove 114 and the radial ports 115 into the passage 108 for movement past the check valve 111 and thence past the spider 109 into the replenishment chamber 79. If the flutter damper is to be filled through the passage provided by the bore 105, fluid is introduced through the outer end of the bore into the check valve passage 108, and sufficient pressure may be developed in the fluid introduced to back through the passage 113 into the auxiliary replenishment chamber 82 and protract the piston 85 to the extent desired.

After filling through the check valve body 115, or before filling the flutter damper through the piston carried hollow stem and check valve structure, the outer end of the bore 105 is sealed by means of a plug 117 threaded into the outer end portion of the bore and pressing a resilient, preferably rubber or rubber-like sealing ring 118 against the adjacent convexly tapered end of the valve body 107. A stem 119 on the closure plug 117 extends through the sealing ring 118 and has an inner end lateral flange 120 which while extending down into the outer end of the outer enlargement of the valve body bore 108 retains the sealing ring 118 against displacement into the head chamber of the bore.

An important advantage of the check valved displacement passage for hydraulic fluid under pressure from the auxiliary replenishment chamber 82 to the replenishment chamber 79 resides in that while hydraulic fluid under pressure will displace from the chamber 82 into the chamber 79 while under pressure of the piston 85, yet when the fluid supply in the chamber 82 is exhausted, fluid in the replenishment chamber 79 remains under residual pressure, perhaps less than in the chamber 82, but nevertheless functioning to replenish the working chambers 32 and 33 for continuing efficient operation of the flutter damper. This is also a useful arrangement where, for any reason, a leak may develop in the auxiliary replenishment chamber 82, and in spite of which the damper will continue to function properly. If a leak develops during service, the damper will continue to function until the aircraft with which associated is given a routine service inspection which will reveal the leak. The fact of an undetected leak will be apparent by inspection of the piston stem and index which will show at a glance the state of supply in the auxiliary replenishing chamber 82 and will reveal whether additional hydraulic fluid is required.

Proper functioning of the damper regardless of the position the damper may assume during maneuvers of the airplane with which associated is assured herein by provision of improved means for eliminating air from the interior of the damper unit. To this end, the top of the casing 17 is provided with air bleed means which can be used during filling of the damper with hydraulic fluid and which can also be brought into operation as a servicing feature to bleed off any air that may have collected in the damper unit while in use. Accordingly, as best seen in Figs. 2, 4, 8 and 9, a blind end bore 121 is provided in the top of the casing 17 above the replenishing chamber 79 and preferably partially over the partition 83. By preference the blind end of the bore 121 is of concave or frusto-conical form and has leading therefrom a relatively small port 122 communicating with the highest point within the replenishing chamber 79, while a similar port 123 communicates between the blind end of the bore and the top of the auxiliary replenishing chamber 82.

Normally sealing the bleed orifice bore 121 is a screw plug 124 threaded into the bore and having a convex tip 125 by which is placed under pressure a resilient rubber or rubber-like sealing disk 127 by which the ports 122 and 123 are effectively sealed against escape of fluid from the interior of the damper unit and also against displacement of fluid by way of the ports from one replenishing chamber to the other. During filling of the unit with hydraulic fluid, the air bleed plug 124 is loosened so that air can escape from the interior of the unit. When hydraulic fluid shows at the air bleed vent, the plug 124 is tightened to seal the vent. When it is desired to release any air that may have been trapped in the unit and which eventually finds its way to the top of the replenishment chambers, loosening of the plug 124 will open the air vent sufficiently for escape of the air under the internal pressure within the damper unit and when hydraulic fluid begins to leak through the air vent so that complete air evacuation is evidenced, the plug 124 is tightened down again.

Figure 9:
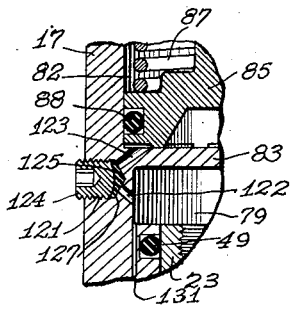
Figure 9 is a fragmentary sectional detail view taken substantially on the line IX—IX of Fig. 4.

In order to facilitate the escape of any trapped air within the unit to the replenishing chamber 79 for bleeding off, an air bleeding groove 128 is provided longitudinally throughout the entire length of the surface of the uppermost of the abutments 31 in contact with the wall defining the reservoir or chamber 30 within the casing 17 (Figs. 2, 3 and 5). It will be observed that to effectuate this air bleeding expedient, the abutments 31 are disposed on a vertical diameter of the cylindrical chamber 30. The air bleed groove 128 joins a similar groove 129 at the inside end of the upper abutment and this, in turn, joins a similar longitudinal groove 130 on the upper of the dowel pins 35. The air bleed groove 130 extends throughout the length of the dowel pin 35 and communicates with the blind end of the pin bore 37 which, in turn, is placed in air bleed communication with the top of the replenishing chamber 79 by means of a small air bleed duct 131 (Figs. 2 and 9). Through this arrangement, every practicable bit of air within the unit will be forced to bleed therefrom under the internal pressure of the hydraulic fluid within the damper unit.

In the modification of Figs. 10 through 14, an elongated small diameter flutter damper unit 135 is provided having a tubular casing 137 providing a housing equipped with attachment flanges 138 at one side thereof for securing the unit in place in the pivot joint portion of a pivoted control member of an airfoil or stabilizer of an airplane. Within the casing 137 is a cylindrical chamber 139 within which is operatively oscillatably mounted a rotary piston structure including a wing shaft 140 having thereon vanes or wings 141 which are in slidable operative engagement with the wall defining the chamber 139 (Figs. 11, 13 and 14). At its inner end portion the wing shaft 140 is journalled in a bearing recess 142 in an inner blind end portion of the casing defining the inner end of the chamber 139. At its outer end portion, the piston shaft 140 projects beyond the outer end of the casing 137 and is oscillatably journalled in a ring-shaped head plate or block 143 which is set into the casing against a shoulder 144. An externally threaded ring nut 145 is screwed into the end of the casing 137 and clamps the closure member 143 in place. A fluid seal between the closure member 143 and the encompassing wall of the casing 137 is provided by a fluid sealing ring 147. Fluid seal between the shaft 140 and the bearing surface of the closure member 143 is provided by a sealing ring structure 148.

Cooperative with the rotary piston wings or vanes 141 within the cylindrical chamber 139 is a diametrically opposite pair of stationary abutments 149. At their inner ends, the abutments are secured by means of dowels 150 extending into appropriate bores in the inner end wall defining the chamber 139 and the casing 137 and aligned dowel bores in the ends of the abutments (Figs. 11, 13 and 14). At their opposite or outer ends, the abutments are secured by means of dowel pins 151 to the closure member 143, these dowel pins being secured in appropriate aligned bores in the ends of the abutments and the closure member. The abutments 149 are disposed in a vertical plane through the axis of the shaft 140 so that one of the abutments is at the top of the unit and the other of the abutments is at the bottom of the unit when the unit is mounted in a movable control member of an airplane airfoil assembly. Thereby, the abutments 149 and the piston shaft wings 141 cooperate to provide opposite working chambers 152 and 153 within the casing chamber 139.

Displacement of hydraulic fluid between the working chambers of the flutter damper 135 is controlled in substantially the same way as in the flutter damper 15. To this end, fluid displacement ports 155 in the wing shaft 140 communicate with the working chambers 152 and a distribution channel 157 in a plug member 158 which is threaded into the inner end of an axial bore in the shaft 140. A plurality of ports 160 leads from the channel 157 to a chamber 161 within the plug 158. The chamber 161 opens into an axial fluid passage bore 162 in a fixed orifice block 163 which is secured in the bore 159 of the wing shaft by the block 158.

Slidably operable in the bore 162 is a cylindrical orifice control valve member 164 (Figs. 11 and 14). An axial blind end bore 165 in the valve member 164 opening from the inner end of the valve member is intersected by a chordal slit 167 in one side of the valve member and which slit provides a control orifice registering with a slit-like chordal control orifice 168 in the orifice body 163 and in communication with an annular fluid distribution groove 169 in the periphery of the orifice body communicating by way of respective ports 170 with the working chambers 153.

The valve member 164 is adjustable from the outer end of the piston shaft 140 and for this purpose is provided with a control stem 171 extending slidably through a reduced diameter outer end portion of the wing shaft bore, with a helical thermostatic element 172 connected between the adjacent ends of the control valve 164 and the stem 171. Through this arrangement, turning of the stem 171 by means of an indicator pointer 173 carried adjacent to its outer end appropriate adjustments of the cylindrical orifice valve member 164 can be effected rotatably in the orifice block 163 which is held non-rotatably in the shaft 140 by means such as a keying pin 174. A similar indexing arrangement is provided at the outer end of the wing shaft 140 for visual observation of the setting of the valve through the medium of the pointer 173, as was described in connection with the flutter damper 15 and for this purpose the outer end portion of the wing shaft is provided with a counterbored recess 175 within which the outer end of the stem 171 and the pointer 173 are housed, and a nut 177 is threaded onto the outer end portion of the stem 171 to secure the pointer 173 in any adjusted condition of the valve to maintain such an adjustment. Appropriate limit pins 178 are provided to limit the range of turning of the stem 171 by engagement of the pins by the pointer 173. A closure cap 179 is threaded onto the outer end of the shaft 140 to enclose protectively the outer indexing end of the stem 171.

Hydraulic fluid is introduced into the damper 135 through an upwardly opening filling port or bore 180 (Figs. 11 and 12) which communicates tangentially with a replenishing chamber 181 separated from the inner end of the reservoir chamber 139 by a solid partition 182. In the bore 180 is a check valve structure comprising a cylindrical valve body 183 threaded into the bore and having an axial passage 184 therethrough which intermediate its ends is of reduced diameter to provide an inwardly facing seat 185 of preferably convex form against which a resilient block, rubber or rubber-like valve member 187 is urged by a coiled compression spring 188 seated at its inner end on a spider 189 carried by the inner extremity portion of the valve body 183. After the unit has been filled with fluid, a sealing plug 190 is threaded into the outer end of the bore 180 and compresses a resilient sealing ring 191 effectively in place at the outer end of the check valve body member.

The hydraulic fluid in the replenishing chamber 181 is maintained under substantial pressure by means of a piston 192 normally driven toward a limit shoulder 193 adjacent the inner end of the replenishing chamber by coiled helical compression spring means comprising an outer spring 194 and an inner spring member 195. The springs are disposed in concentric relation to exert a combined pressure of considerable magnitude upon the hydraulic fluid in the replenishing chamber 181 through the medium of the piston 192. A peripheral sealing ring 197 about the piston 192 provides a fluid seal at the interface with the wall of an elongated cylindrical chamber 198 within an elongated cylindrical casing extension 199 the extremity of which is closed by a closure cap 200 threaded thereinto. A guide stem 201 projects axially from the outer side of the piston 192 coaxially through the spring 194 and 195 and slidably at its outer end portion through a bearing bore 202 in the cap member 200. By providing the distal extremity portion of the piston stem 201 with a longitudinal series of calibrations such as annular shallow grooves 203 the piston stem 201 becomes an indicator rod indicating the amount of fill in the replenishing reservoir 181. For example, the indicator grooves or marks 203 may be disposed one quarter of an inch apart longitudinally of the stem 201 and the number of the indicator markings visible indicate the amount of reserve fluid in the replenishing chamber. When servicing the airplane, the servicing personnel can determine at a glance whether leakage has occurred which will require refilling the flutter damper, by inspecting the indicator rod end of the unit.

Hydraulic fluid under pressure from the replenishing chamber 181 passes to the working chambers of the unit through a pair of passages 204 (Figs. 11 and 12) through the partition 182 and controlled by ball check valves 205 whereby return of fluid from the working chambers into the replenishing chamber is avoided.

In order to bleed the unit free from air, a bleed orifice 207 is provided to open from the top of the replenishing chamber 181. Under the pressure to which the hydraulic fluid is subjected in the damper, the air tends to accumulate under compression at the top of the replenishing reservoir. Normally the bleed orifice 207 is closed by a screw plug 208 which can be loosened sufficiently to bleed the air from the unit and as soon as liquid begins to escape is closed to seal the air bleed orifice.

In order to purge the working chamber section of the damper unit of air, the outer periphery of the upper abutment member 149 is provided with a longitudinal air duct 209 extending from end to end thereof and communicating at its inner end with an air bleed passage 210 extending through the upper portion of the partition 182 to the air bleed orifice 207. In order to facilitate drilling the air bleed passage 210, it may be drilled to a larger diameter than actually required and then plugged by means of a filler pin 211 having a longitudinal peripheral air bleed groove 212 of small cross sectional flow area extending throughout the length of the air bleed passage and in communication with the air bleed groove passage 209 of the upper abutment member.

In mounting the flutter damper unit 135, the attachment flanges 138 on one side of the casing are secured to appropriate brackets or other structure within the pivoted control vane or portion of an airfoil assembly, with the axis of the damper unit on the pivotal or hinge axis of the control member with which associated. The wing shaft 140 is then connected to the airfoil such as a stabilizer or airplane wing, through the medium of a connecting arm 213 (Figs. 10 and 11). This arm is secured to a split clamp 214 engaged upon a longitudinally knurled or fluted external extremity portion surface 215 of the wing shaft 140 exposed outwardly beyond the securing nut 145. The attachment clamp 214 is secured fixedly on the end of the wing shaft by means of a tightening and keying bolt 217 which intersects and fits in a transverse keying groove 218 in the periphery of the wing shaft. Thereby the arm 213 is held on the wing shaft against rotatable or axial displacement.

To hold the closure cap 179 against vibrating loose, it is preferably tied to the arm clamp member 214 as by means of a tying wire 219 which extends through one of a plurality of tie wire apertures 220 provided in the rim flange of the cap and with the wire 219 extending between the aperture 220 which is nearest a tie wire aperture 221 through which it also extends in the clamp member. This provides an effective but readily releasable lock for the closure cap.

It will be understood that modifications and variations may be effected without departing from the scope of the novel concepts of the present invention.

We claim as our invention:

1. In a flutter damper of the character described, an elongated small diameter housing having means at one side for attachment to the inside of a pivotally mounted control member of an airfoil assembly, said housing having an elongated cylindrical chamber therein which is substantially longer than its diameter, a wing shaft axially disposed in said chamber and having wings cooperating with the wall defining said chamber, means carried by said housing providing rotary bearings for said wing shaft adjacent the opposite ends of said wings, fixed abutments disposed longitudinally within said chamber at diametrically opposite sides of said wing shaft intermediate said wings and located in substantially a vertical plane relative to said housing in service position, one end of said wing shaft projecting beyond one end of the housing and the other end of the wing shaft being disposed interiorly of the housing, said housing having a replenishing chamber beyond said other end of the wing shaft, means for filling hydraulic fluid into said replenishing chamber, means in said replenishing chamber for exerting pressure on the hydraulic fluid in the replenishing chamber, said housing having check valved passages from the replenishing chamber to said cylindrical chamber, hydraulic fluid displacement control means on said wing shaft for controlling displacement between the subchambers into which said cylindrical chamber is divided by said abutments and said wings, and means at the top of the housing in service position and separate from said filling means providing an air bleed system communicating with the top of said replenishing chamber and said elongated chamber comprising an air purging passage extending along the top of the uppermost of said abutments and having communication with said elongated and said replenishing chambers, and means for relieving air from the top of said communicating chambers under manual selection.

2. In combination in a flutter damper, a casing providing a housing having a chamber therein, mechanism in said chamber operable on the principle of hydraulic fluid resisted movement within the chamber, means on said casing providing a replenishing chamber, a piston reciprocable in said replenishing chamber, spring biasing means acting on said piston normally to maintain the piston in one position in the chamber, said piston having a stem, and means for filling the replenishing chamber through said piston stem.

3. In combination in a flutter damper, a casing providing a housing having a working chamber portion, hydraulic fluid resisted operating mechanism in said chamber, said casing having a replenishing chamber therein, a check valve passage in said housing between said replenishing chamber and said working chamber, means in said casing providing an auxiliary replenishing chamber separated from said replenishing chamber, a check valved passage between said auxiliary replenishing chamber and said replenishing chamber and permitting fluid to flow from the auxiliary chamber to the replenishing chamber but not in return, a spring biased pressure piston in said auxiliary replenishing chamber to maintain pressure on hydraulic fluid therein to force the fluid into said replenishing chamber, and means for delivering hydraulic fluid into said auxiliary replenishing chamber.

4. In combination in a flutter damper, a casing providing a housing having a working chamber portion, hydraulic fluid resisted operating mechanism in said chamber, said casing having a replenishing chamber therein, a check valve passage in said housing between said replenishing chamber and said working chamber, means in said casing providing an auxiliary replenishing chamber separated from said replenishing chamber, a check valved passage between said auxiliary replenishing chamber and said replenishing chamber and permitting fluid to flow from the auxiliary chamber to the replenishing chamber but not in return, a spring biased pressure piston in said auxiliary replenishing chamber to maintain pressure on hydraulic fluid therein to force the fluid into said replenishing chamber, and means for delivering hydraulic fluid into said auxiliary replenishing chamber, said fluid delivering means comprising a passage through said piston having a check valve therein.

5. In combination in a flutter damper, a casing providing a housing having a damping chamber therein, mechanism in said chamber operable on the principle of hydraulic fluid resisted movement within the damping chamber, means on said casing providing a replenishing chamber, means acting in said replenishing chamber to maintain a high pressure on hydraulic fluid in the replenishing chamber, means accommodating the supply of fluid from said replenishing chamber to said first mentioned chamber, fluid passage means extending along the top of said damping chamber when the damper is in service position and providing an air bleed system communicating directly with the top of said damping chamber and the top of the replenishing chamber to facilitate the escape of any trapped air from the damping chamber to the replenishing chamber, and air bleed means communicating directly with the top of said replenishing chamber and with said fluid passage means for accommodating release of any air that may have been trapped in the replenishing and damping chambers.

6. In combination in a flutter damper, a casing providing a housing having a damping chamber therein, mechanism in said damping chamber operable on the principle of hydraulic fluid resisted movement within the damping chamber, means on said casing providing a replenishing chamber, means providing communication between said replenishing chamber and said damping chamber, means for exerting a high pressure on fluid in said replenishing chamber to force replenishing fluid into said damping chamber as required, air bleed passage means communicating directly with the top of said damping chamber and said replenishing chamber for facilitating the escape of any trapped air within the damping chamber to the replenishing chamber, an air bleed escape passage opening into the top of said replenishing chamber, seal means disposed in said passage for sealing the passage against escape of fluid from the replenishing chamber, and air bleed plug means acting on said seal means to urge the same into sealing relation and releasable from said seal means to release any air trapped in said replenishing chamber, whereby the air bleed plug means may be loosened in servicing the damper for escape of air under the internal pressure within the replenishing chamber and when hydraulic fluid begins to leak through the air bleed escape passage, complete air evacuation is evidenced.

7. In combination in a flutter damper, a casing providing a housing having a damping chamber therein, mechanism in said damping chamber operable on the principle of hydraulic fluid resisted movement within the damping chamber, means on said casing providing a replenishing chamber, means providing communication between said replenishing chamber and said damping chamber, means for exerting a high pressure on fluid in said replenishing chamber to force replenishing fluid into said damping chamber as required, air bleed passage means communicating with said damping chamber at the top thereof and leading to the top of said replenishing chamber for facilitating the escape of any trapped air within the damping chamber to the replenishing chamber, an air bleed escape passage opening into the top of said replenishing chamber, seal means disposed in said passage for sealing the passage against escape of fluid from the replenishing chamber, and air bleed plug means acting on said seal means to urge the same into sealing relation and releasable from said seal means to release any air trapped in said replenishing chamber, whereby the air bleed plug means may be loosened in servicing the damper for escape of air under the internal pressure within the replenishing chamber and when hydraulic fluid begins to leak through the air bleed escape passage, complete air evacuation is evidenced, said air bleed escape passage having a shoulder facing toward the exterior of said casing, said seal means comprising a resilient pad seated against said shoulder and covering the portion of the air bleed escape passage opening into said replenishing chamber from said shoulder, and said air bleed plug means being threadedly engaged in said air bleed escape passage outwardly of said shoulder and being movable into tight sealing relation to said resilient pad.

8. In a flutter damper, an elongated housing having a damping chamber therein, a rotary piston in said damping chamber, dividers extending along the top and bottom of said damping chamber and cooperating with said rotary piston for dividing said damping chamber into a plurality of working chambers of increasing and decreasing volume, a replenishing chamber within said housing at one end of said working chamber, means for supplying hydraulic fluid to said replenishing chamber, means in said replenishing chamber for maintaining pressure on the hydraulic fluid therein and check valved passageways for supplying hydraulic fluid from said replenishing chamber to said working chambers, valve means carried by said piston for controlling the displacement of hydraulic fluid from the working chambers of decreasing volume to the working chambers of increasing volume, a passageway extending along the top of the uppermost of said dividers and the wall of said damping chamber and having communication with said replenishing chamber directly with the top thereof, an air bleed escape passage opening directly into the top of said replenishing chamber, and seal means manually releasable to accommodate the escape of air through said passageway.

References Cited in the file of this patent

UNITED STATES PATENTS

| | | |
|---|---|---|
| 1,827,487 | Reeves | Oct. 13, 1931 |
| 2,021,428 | Peo | Nov. 19, 1935 |
| 2,228,984 | Broecker | Jan. 14, 1941 |
| 2,270,668 | Davis | Jan. 20, 1942 |
| 2,385,635 | Maurer | Sept. 25, 1945 |
| 2,419,651 | Magrum | Apr. 29, 1947 |
| 2,421,585 | Thiry | June 3, 1947 |
| 2,469,488 | Woods | May 10, 1949 |
| 2,516,781 | Magrum et al. | July 25, 1950 |

FOREIGN PATENTS

| | | |
|---|---|---|
| 510,204 | France | Aug. 31, 1920 |